Nov. 3, 1936.　　　N. C. SCHELLENGER　　　2,059,712
CONTROL DEVICE
Filed March 5, 1934　　　4 Sheets-Sheet 1

Inventor.
Newton C. Schellenger.
By: Charles H Beardsley
Att'y.

Nov. 3, 1936.   N. C. SCHELLENGER   2,059,712
CONTROL DEVICE
Filed March 5, 1934   4 Sheets-Sheet 2
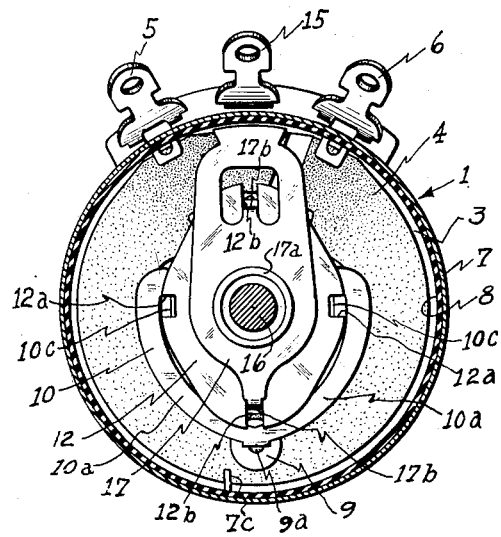
Fig: 4.
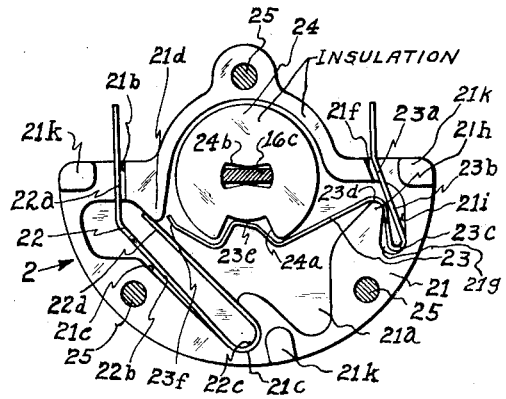
Fig: 5.
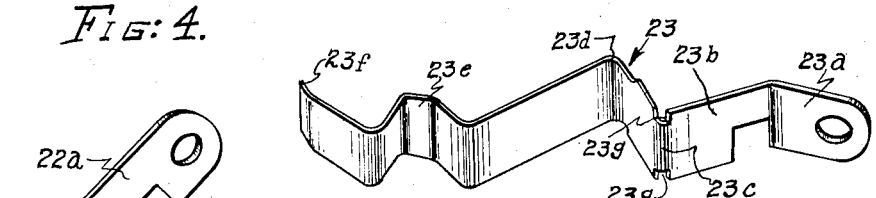
Fig: 7.
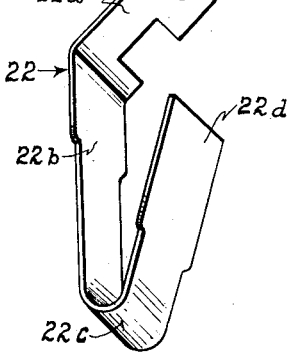
Fig: 6.
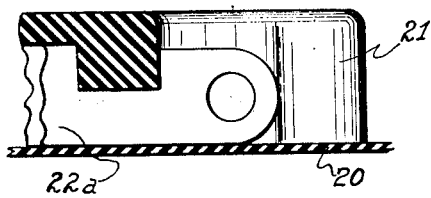
Fig: 8.
Inventor.
Newton C. Schellenger.
By: Charles H. Beardsley
Atty.

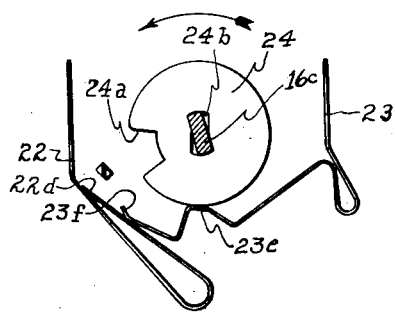
Fig: 9.
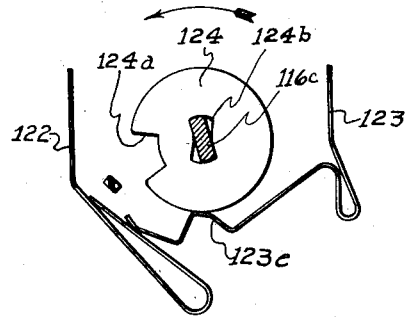
Fig: 12.
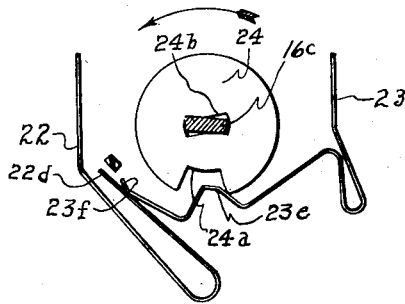
Fig: 10.
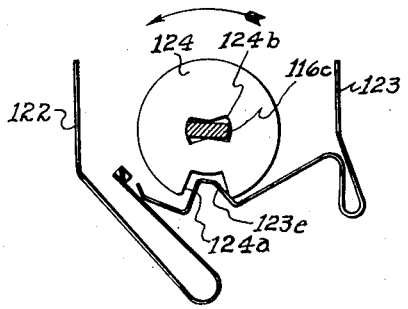
Fig: 13.
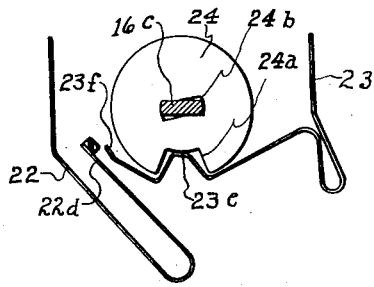
Fig: 11.
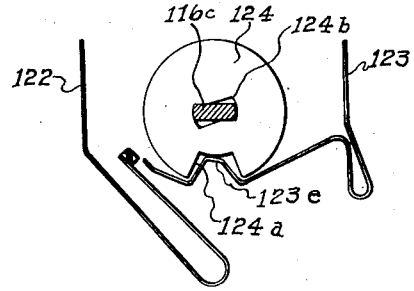
Fig: 14.
Inventor:
Newton C. Schellenger.
By: Charles H. Beardsley.
Att'y.

Nov. 3, 1936.  N. C. SCHELLENGER  2,059,712
CONTROL DEVICE
Filed March 5, 1934  4 Sheets-Sheet 4
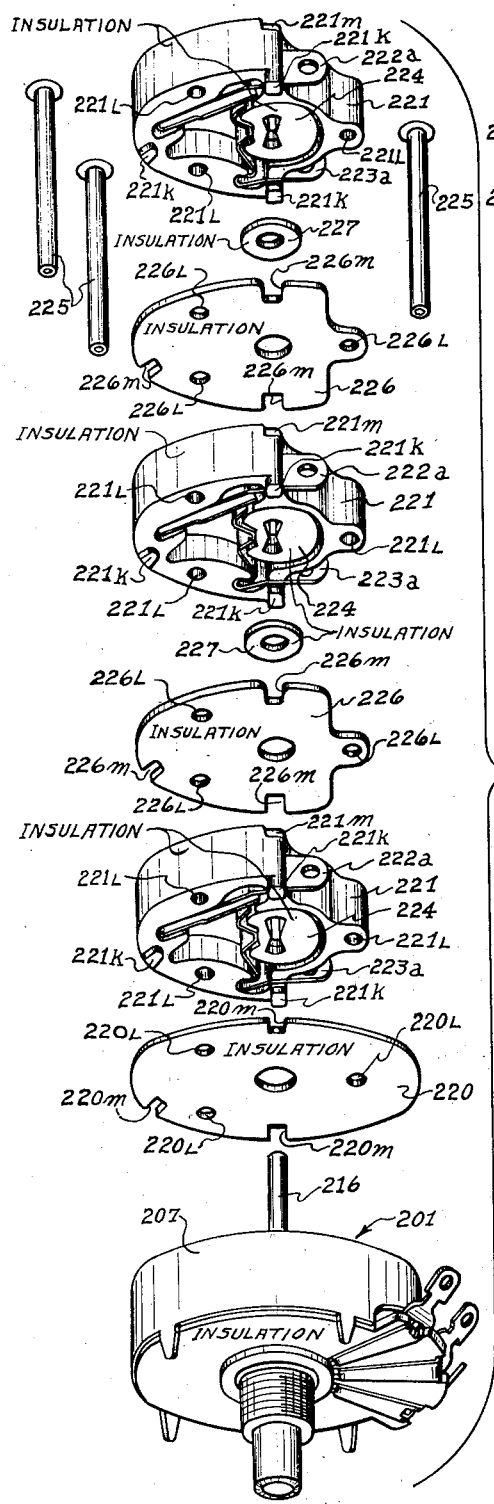
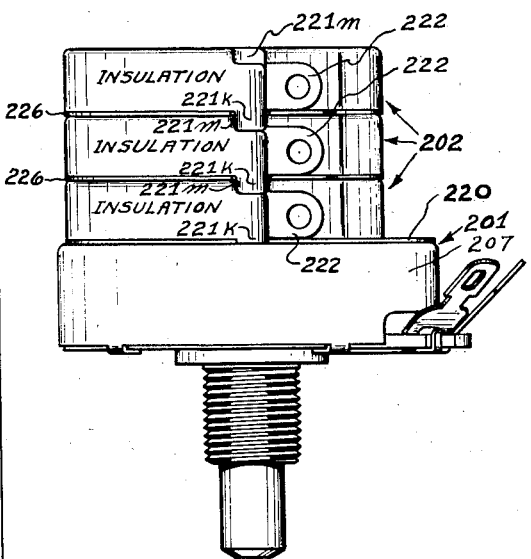
Fig. 15.
Fig. 16.
Inventor.
Newton C. Schellenger.
By: Charles H Beardsley
Att'y.

Patented Nov. 3, 1936

2,059,712

UNITED STATES PATENT OFFICE 2,059,712

CONTROL DEVICE

Newton C. Schellenger, Elkhart, Ind., assignor to Chicago Telephone Supply Co., Elkhart, Ind., a corporation of Indiana Application March 5, 1934, Serial No. 713,973

4 Claims. (Cl. 200—153)

This invention relates to control devices and particularly to a switch adapted to be used in combination with another control device such as a variable resistance device.

This switch is particularly adapted to be used in structural and operative combination with volume or tone control units for radio sets for switching the power supply of a radio set. The switch meets the very rigid requirements of the radio trade, due to its small size, long life, relatively high current carrying capacity, ruggedness, the very uniform low contact resistance that is maintained throughout the life of the switch, the large number of switching combinations that can be obtained, and its adaptability for use with either A. C. or D. C. power supply by the interchanging of a single element of the switch. The maintenance of a very low contact resistance is of great importance especially when a low voltage, high current power supply is used, such as in the case of many battery operated radio sets. An increase above normal of only a few thousandths of an ohm in the contact resistance may render the set inoperative due to the considerable drop in voltage resulting from this increased resistance. In the switch of my invention there is a relatively high contact pressure when the switch contacts are engaged and a long wiping movement of one contact over the other during the opening and closing movement, which features serve to keep the contacting surfaces free from contamination and result in the maintaining of a very low resistance between the contacts.

It is well known that, in a switch carrying alternating current, less arcing results when the contacts are separated slowly than when they are separated rapidly. Reference may be made to my copending application Serial No. 703,917, filed December 26, 1933, for a detailed discussion of this problem. However, it should be noted that when a direct current is carried by a switch, it is very essential that the switch contacts be separated very rapidly in order that the arc will be extinguished in the shortest possible time, otherwise serious burning of the contacts may result. Since many different sources of power such as 6 volt direct current, 125 volt direct current and 125 volt alternating current, are used for operating radio sets, it is obvious that a single type of switch, namely, either a slow break or a fast break switch, cannot be used for all of these applications if the maximum switch life is to be obtained.

In the switch of my invention the requirement for alternating current operation, namely, a slow break action, wherein the contacts are opened slowly, can be satisfied by the use of an actuator or cam that provides only a small amount of angular lost motion on the control shaft. The requirement of a fast separation of the contacts, necessary where the switch is used to control direct current circuits, can also be satisfied with this switch by substituting a cam having a greater amount of lost motion on the control shaft than the cam used to produce a slow break action. In either case an audible and tactile signal indicates when the switch is thrown to the "off" position. Herefore, where it was desired to obtain a quick break action, it was necessary to use a switch of entirely different design than that used where a slow break action was desired, which requirement resulted in unnecessary expense and inconvenience to the user. The switches used in these combinations were of complicated structure employing a comparatively large number of parts and they were mounted on the associated control devices in such a manner that it was impossible to obtain a thorough electrostatic and electromagnetic shielding between the switch and the other control device.

In switches of the prior art which were suitable for use in combination with another control device, the inherent nature of the switch designs were such that they were not readily adaptable to the various switching combinations. In most cases it was possible to construct the switch only as a single-pole-single-throw or single-pole-double-throw type and, in a few instances, as a double-pole-single-throw type. Obviously, a switch having such a range of combinations has but a limited application. In many applications it is desirable to employ a single switching device of unitary construction to control as many as four separate circuits simultaneously or in a predetermined sequence.

Most of the prior art switches required a considerable force to throw them to the open circuit position. This resulted in an undesirable increase in resistance being offered to the rotation of the control shaft when the shaft was rotated through that portion of its travel wherein it effected operation of the switch. Thus, the control shaft would turn easily throughout most of its movement and then suddenly a materially increased resistance to rotation would be encountered, which was usually found to be undesirable.

One of the objects of the present invention is the provision of a simple, rugged, compact and inexpensive switch which is readily adapted for use alone or in operative combination with a variable resistance device or other control device.

Another object of the invention is the provision of a switch having a minimum number of parts all of which parts can be formed by simple machine operations and which can be readily and quickly assembled and held in place with the use of no, or in some instances few, fastening members other than the operative parts of the switch.

Another object of the invention is the provision of a switch which, by a simple variation in the design of the actuating member, may be constructed as either a quick break or a slow break switch.

Another object of the invention is the provision of a switch wherein the operation thereof is accompanied by an audible and tactile signal produced by the switch members as they perform the movements incident to the operation of the switch.

Another object of the invention is the provision of a switch which is adapted for combination with similar switch units to provide a multiple unit structure, the units of which may be controlled by a control member common to all of the units.

Another object of the invention is the provision of a switch adapted for combination with other control devices and having a control shaft or member extending entirely through the switch housing for the operation of other control devices located on opposite sides of the switch housing.

Another object of the invention is the provision of a switch wherein the switch may be thrown to open circuit position by a torque no greater than the torque required to turn the control shaft of the switch throughout the remainder of its movement when the switch is in closed position.

Another object of the invention is the provision of a switch wherein the contact elements are forced into engagement under a relatively high pressure, and with wiping engagement, and wherein the contact elements are so formed and arranged that the arcing occurring when the switch is opened takes place between such points on the contact elements that even if the arc receiving portions of the contact elements are partially consumed and greatly weakened, the contact elements will engage under a high pressure throughout a long period of use.

Other objects will appear from the following description taken in connection with the appended drawings, wherein:

Fig. 4 is a view showing a section taken along line 4—4 of Fig. 3;

Fig. 5 is a view from the bottom of the switch housing showing the shaft in position and sectioned, the switch being shown in the "off" position;

Fig. 6 is an enlarged isometric view showing one of the contact members of the switch;

Fig. 7 is a similar view showing the other contact member;

Fig. 8 is a fragmentary sectional view showing a detail of construction;

Figs. 9 to 11 are diagrammatic views showing the switch elements in "closed", "intermediate" and "open" positions respectively;

Figs. 12 to 14 are corresponding views showing diagrammatically the elements of a switch having a cam of modified design for providing a quick break action of the switch;

Fig. 15 is a side elevational view showing a combined variable resistance device and multiple switch unit; and Fig. 16 is an exploded view showing the structure of Fig. 15.

Figures 1, 2:
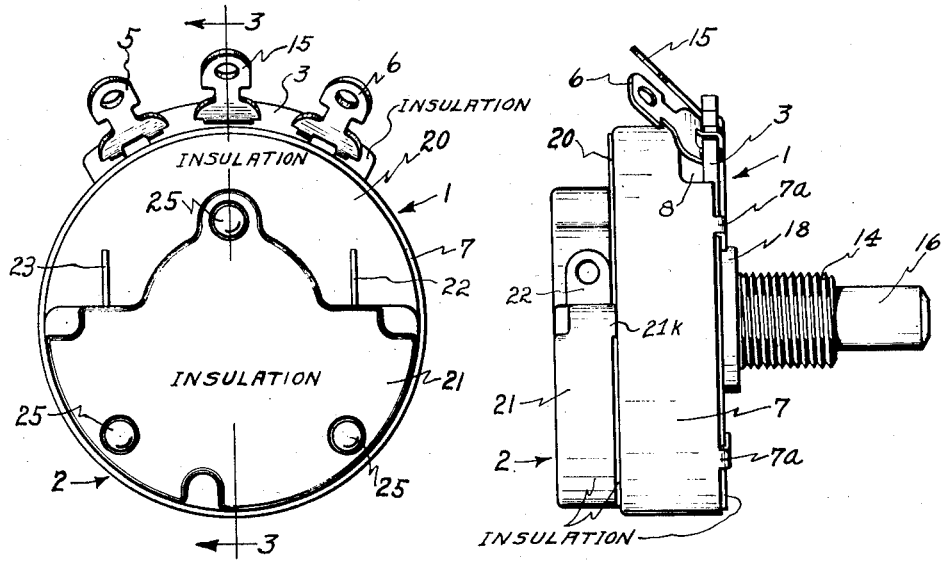
Fig. 1 is a top plan view showing a combined variable resistance device and switch constructed according to the invention.
Fig. 2 is a side elevational view showing the structure of Fig. 1.

In Figures 1 to 4 is shown a combined variable resistance device generally designated 1 and switch generally designated 2.

The variable resistance device 1 comprises a base 3 formed of insulating material and carrying a substantially annular resistance element 4 of the conductive film type which is engaged by end terminals 5, 6 clamped on the base 3 which terminals 5, 6 provide means for connecting the ends of the effective portion of the resistance element 4 to an external circuit (not shown). The terminal structure is disclosed more in detail and is claimed in my copending application Serial No. 711,644, filed February 14, 1934. A housing is constituted by the base 3 and by a cupped metal cover member 7, secured to the base 3 by integral ears 7a, and spaced axially with respect to the base by a ring of insulation 8.

A disk-like contactor 9 is pressed against the surface of the resistance element 4 by a pressure member 10 having a pair of arms 10a extending outwardly over the base 3 and bent over to enter a perforation 9a in the contactor. The pressure member 10 has a resilient, initially warped annular slip ring portion 10b engaging a collector ring 11 and formed with upturned ears 10c entering slots 12a in an insulating drive plate 12 whereby the contactor 9 is positioned on the resistance element 4 in accordance with the position of the drive plate 12. The collector ring 11 is pressed against an insulating washer 13 seated on the flanged head 14a of an externally threaded mounting bushing 14 and is electrically connected to a third or contactor terminal 15 by a tail 11a extending through a hole in the contactor terminal near the end 15a and clamped under the bent over end 15a of the contactor terminal 15.

The drive plate 12 is mounted on a rotatable shaft 16 and is driven thereby through a drive yoke 17 formed with an internally knurled collar 17a pressed onto the shaft 16 and down-turned ears 17b engaging slots 12b in the drive plate 12. The shaft 16 extends through and finds a bearing in the bushing 14 which is relieved except at the portion 14b which constitutes a short bearing for the shaft. The bushing 14 extends through the base 3 and has the toothed flanged head 14a engaging the inner face of the base 3 to nonrotatively secure the bushing 14 in the base 3. The bushing 14 is held against axial displacement in the base 3 by the flanged head 14a and by a washer 18 on the other side of the base 3 into which washer 18 the material of the bushing 14 is swaged.

The shaft 16 has a portion 16b of reduced diameter journaled in a bearing 7b formed in the cover 7. The bearing is formed by perforating the end wall of the cover 7 and forming the material surrounding the perforation into the shape shown. The bearing lies entirely below the plane of the exterior face of the end wall of the cover 7 and the edges of the perforation lie in this plane, thus a substantially flat mounting surface is provided. The bearing 7b thus constituted serves both as a journal bearing for the reduced portion 16b of the shaft 16 and as a thrust bearing cooperating with the shoulder adjacent the reduced portion 16b. A thrust washer 19 interposed between the bearing 7b and the shoulder provides a smooth intermediate thrust bearing and insures positive electrical connection between the shaft and the cover.

This bearing 7b cooperates with the other bearing 14b to provide two relatively widely spaced supports. Since the shaft 16 is engaged by the bushing 14 only along a short length of the shaft 16, the end 16b of the shaft 16 which enters the other bushing 7b can be slightly tilted to permit the shaft 16 to enter the bearing 7b if the bearings 14b, 7b are not in exact alinement; this also prevents binding of the shaft 16 in the bearings 14b, 7b.

Axial displacement of the shaft 16 in one direction is limited by the drive yoke 17 and members interposed between it and the flanged head 14a of the bushing 14 and in the other direction by the shoulder adjacent the reduced portion 16b bearing against the thrust washer 19 which in turn bears against the flat end of the bearing 7b.

When the shaft 16 is rotated, the drive yoke 17 moves the drive plate 12 angularly on the base 3 to vary the angular position of the pressure member 10, thus the contactor 9 is moved over the surface of the resistance element 4 to vary accordingly the length of the resistance element 4 between the contactor 9 and end terminals 5, 6 respectively; thus, the effective resistance between the contactor terminal 15 and the end terminals 5, 6 respectively is varied in accordance with the rotational adjustment of the shaft 16. Movement of the movable elements driven by the shaft 16 is limited in both directions by a stop 7c bent inwardly from the cover member 7 and lying in the path of the end of the drive yoke 17.

The construction and operation of the variable resistance device 1 are disclosed more in detail and claimed in my copending application Serial No. 721,728 filed April 21, 1934.

The switch 2 is mounted on the flat end wall of the cover member 7 of the variable resistance device 1 and is insulated therefrom by a thin plate 20 of insulating material disposed between the switch 2 and the cover member 7.

The switch 2 comprises a base or housing member 21 of molded insulating material having a recess 21a in which is disposed a pair of contact members 22, 23 formed of spring temper phosphor-bronze or other suitable resilient conductive material. One contact member 22 has a notched end portion 22a extending through a notch 21b in a wall of the housing 21, a long straight portion 22b extending from the notched end portion to a return bend 22c which is seated in an arcuate seat 21c in the housing, and a movable end portion 22d which bears against either the wall of a boss 21d formed in the housing 21, or against the end of the other contact member 23, depending upon whether the switch 2 is in open circuit or closed circuit position. The contact member 22 is clamped between the housing 21 and the insulating plate 20 (see Fig. 8) when the switch 2 is secured in position on the cover 7, and is thus securely positioned in the housing 21 without the use of auxiliary fastening members such as screws, rivets or the like, other than the members necessary to secure the switch 2 to the variable resistance device 1.

The wall of the housing is cut back at a portion 21e adjacent the long straight portion 22b of the contact member 22 which extends between the notched end portion 22a and the return bend 22c, to permit this long straight portion 22b of the contact member 22 to bow when the contact members 22, 23 are in engagement, thus providing a greater effective length of the contact member 22 than would exist if this section of the spring were supported to restrain its bending.

The other contact member or selector spring 23 is held in place in the switch casing 21 in a manner very similar to that just described. A notched end portion 23a extends through a notch 21f in the side wall of the housing 21, a normally straight portion 23b extends to a relatively flat return bend or fold 23c which is wedged in a narrow recess 21g in the housing 21, and another bend 23d is engaged and supported by a boss 21h in the housing 21 so that a slight pressure is applied to the portion 23b intermediate the fold 23c and the notched end portion 23a which tends to bow this portion somewhat; the housing 21 has a cut back portion 21i to permit this bowing action. The free end of the selector spring 23 has formed between the end 23f and the supported bend portion 23d, an offset portion 23e having sloped sides and adapted to engage a notch 24a formed in from the periphery of an actuating member or cam 24. The end of the selector spring 23 is turned back slightly to provide a flat tip 23f so that a smooth surface of considerable extent is presented to the other contact member 22 when contact is made; thus a minimum amount of wear will occur and the contact resistance will be maintained uniformly low.

The operating member or cam 24 is mounted on a flatted portion 16c of the operating shaft 16 of the variable resistance device 1, which shaft 16 extends through the cover 7 and insulating plate 20 into the interior of the switch housing 21.

A limited amount of angular rotation of the cam 24 relative to the shaft 16 is permitted without any substantial lateral displacement by providing in the central portion of the cam 24, a hole 24b of double fan shape, that is, wide at both ends and narrow in the middle and having its sides extending angularly to meet arcuate ends. The hole 24b is formed with its greatest dimension (as measured in the plane of the face of the cam) approximately equal to the greatest dimension of the flatted portion 16c of the shaft with the width of its narrowed center section approximately equal to the width of the flatted portion 16c of the shaft 16. The switch housing 21 is recessed to provide a small clearance around the periphery of the cam 24 so that it will be shifted only a small amount from its operating position when the shaft 16 is not in engagement therewith. The shoulder formed at the base of the flatted section 16c holds the cam 24 close to an annular boss or support 21j formed in the switch housing 21 so that axial movement of the cam 24 in the housing 21 is limited. If desired, the flatted section 16c of the shaft 16 may be projected through the back of the housing 21 so that another switch or other apparatus may be operated as will hereinafter be more fully described in connection with Figs. 15 and 16.

The notch 24a formed inwardly from the periphery of the cam 24 is shaped to receive the offset portion 23e of the selector spring 23 when the shaft 16 rotates the cam 24 to a predetermined angular position. The remaining portion of the periphery of the cam 24 is circular and concentric with the axis of the shaft 16 so that the position of the selector spring 23 will not change when offset portion 23e is in engagement with this circular surface but only when the offset portion 23e is in registry with the notch 24a or in engagement with the side walls thereof.

Figure 3:
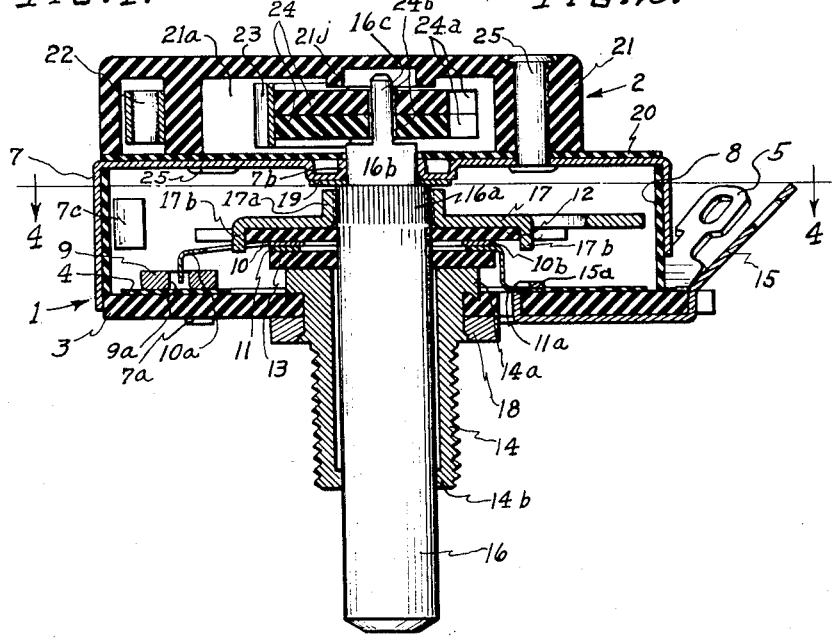
Fig. 3 is an enlarged view showing a section taken along line 3—3 of Fig. 1.

The cam is preferably constituted by two identical members of fiber having the form shown in Figs. 3 and 5. The cam also may be formed of a single member (not shown) of fiber having twice the thickness of the individual members employed in the two piece cam, however, the two piece cam is usually preferable as will appear. Since each member of the two piece cam is only half as thick as the cam itself, each member can be punched from a sheet of fiber more readily and with smoother edges than the thicker, single member of the one piece cam.

By forming the cam 24 of two members, it is possible to provide a novel and convenient lubricating arrangement for the cooperating surfaces of the cam 24 and selector spring 23. A small quantity of lubricant is disposed between the two members of the cam 24 and the members lightly pressed together axially. The lubricant will be held between the cam members by capillary attraction and will lubricate the surface of the selector spring 23 where it is in contact with the cam due to capillary attraction maintaining a film of oil between these moving surfaces. If desired, a thin felt pad (not shown) may be interposed between the members of the cam 24 to assist in retaining the lubricant.

The contact member 22 is formed in the shape shown in Fig. 6. The notched end portion 22a is perforated and adapted to project from the housing 21 (as shown in Fig. 8) to constitute a terminal for the switch 2 and the principal portion is reduced in width so that it will not bind against the housing 21 or insulating plate 20 when clamped in position but free movement of this portion of the contact member 22 will be permitted. The movable end portion 22d is enlarged slightly to provide a wide contact surface but not enough to cause binding. The return bend 22c is formed with a considerably greater angle than the angle into which the contact member 22 is bent when assembled in the housing 21.

The contact member 22 is assembled in the switch housing 21 by springing the straight portions 22b, 22d closer together, engaging the notch of the notched end 22a with notch 21b in the housing 21, pressing the contact member 22 into the housing 21 until the contact member 22 is fully seated in the housing 21, and releasing the portions 22b, 22d so that the contact member 22 is held in place by its own spring pressure against the walls of the recess 21a.

The selector spring 23 is normally formed as shown in Fig. 7 by a punch press operation. The end 23a of the selector spring likewise is formed with a perforation and projects from the housing 21 to constitute a terminal. The principal portion is also reduced in width to prevent rubbing on the housing 21 or on the plate 20. Opposing slots 23g in the contact member create a reduced portion at the point where the bend 23c is to be made. At this porton of the selector spring 23 a preliminary bend of approximately 90° is made by a machine operation prior to the assembly of the selector spring 23 in the housing 21. The selector spring 23 is assembled in the housing 21 by bending it by hand until the portions on both sides of the bend 23c are brought into engagement and a relatively flat bend or substantially a fold is produced.

The provision of the reduced portion at the bend 23c insures that the bending that is done by hand will occur at a predetermined point and also renders the bending easy so that the assembly operation may be performed rapidly and with uniform results. After the selector spring 23 is thus manually bent, the return bend portion 23c is pressed into the recess or seat 21g, and the notched portion 23a into engagement with the notch 21f of the housing 21 so that the bend 23d is held between the boss 21h on the housing 21 and the portion 23b. At this stage of assembly the movable portion or free end 23f of the contact member 23 lies over a portion of the housing 21 that is normally covered by the cam 24. The cam 24 is next inserted and the contact member 23 moved to its normal open circuit position with the offset portion 23e engaging the notch 24a in the cam 24. The spring pressure of the contact member 23 when in this position forces the cam 24 out of its normal position so that it bears against the wall of the housing 21.

The switch 2 is placed in position on the cover member 7 of the variable resistance device 1 with the insulating plate 20 interposed between the switch 2 and the cover member 7, and positioning lugs 21k extending from the switch housing 21 through corresponding perforations (not shown) in the insulating plate 20 and the cover member 7 to maintain these members in proper angular relation. The switch 2 is then permanently secured in place by rivets 25 that extend through holes in the switch housing 21 and through corresponding holes in the insulating plate 20 and cover 7. This clamps the contact members 22, 23 of the switch 2 between the end wall of the switch housing 21 and the insulating plate 20.

The end of the flattened portion 16c of the shaft 16 is tapered so that as the cover member 7 with the switch 2 mounted thereon is assembled with the remainder of the variable resistance device 1, the shaft 16 will center the cam 24 in the switch housing 21 and slip into place. The extent of the taper on the end of the shaft 16 is always slightly in excess of the distance the cam 24 can be forced off center by the selector spring 23 when the shaft 16 is not in place, so that no difficulty is encountered with assembly.

It will thus be observed that I have provided a switch with a very effective electrostatic and electromagnetic shield between the current carrying members of the switch and the current carrying members of the variable resistance device. The shaft 16 extending through the bearing 7b in the cover 7 closes this opening and the rivets 25 close the other openings with the exception of those engaged by the positioning bosses 21k. If desired, rivets can be employed as the sole means of positioning the switch casing 21 on the cover 7 and the bosses 21k and cooperating holes dispensed with. When this is done all openings in the cover 7 between the switch 2 and the variable resistance device 1 are filled with metallic members in contact with the cover 7. The cover 7 will normally be grounded through the shaft 16 to which it is electrically connected by the metal washer 19 acting as a thrust bearing between the shoulder on the shaft 16 and the bearing 7b in which the shaft 16 operates. The shaft 16 is journalled in and therefore electrically connected to the bushing 14 which will normally be in contact with a grounded metal panel when the control device is in operation. In the event that a grounded metal panel is not used, a supplemental grounding connection will be necessary to effectively ground the shielding arrangement.

The switch 2 is operated in the usual manner by rotation of the shaft 16 controlling the variable resistance device 1 and normally the switch 2 is arranged to be operated during the movement of the movable contactor 9 of the variable resistance device 1 through that portion of the movement wherein the contactor 9 is not in contact with effective portion of the resistance element 4. The operation of the switch 2 will be clear if reference is made to the diagrammatic illustrations of Figs. 9 to 11 inclusive.

The switch 2 is thrown into its open circuit position by rotating the shaft 16 in the direction indicated by the arrow in Fig. 9 until the leading edge of notch 24a moves into engagement with the sloped side of the offset portion 23e whereupon the selector spring 23 exerts a rotational force on the cam 24 due to the relationship of the slopes of the two cooperating surfaces to each other and the pressure exerted by the contact member 23. This rotational force results in the cam 24 suddenly increasing its speed of rotation and taking up the angular clearance between the cam 24 and the flattened portion 16c of the shaft, and the offset portion 23e of the contact member 23 partially enters the notch 24a in the cam 24.

This movement of the cam 24 takes place substantially independently of the flattened portion 16c so that the walls of the central opening 24b in the cam 24 through which the flattened portion 16c extends, engage the flattened portion 16c and prevent further movement of the cam 24 independently of the shaft 16. When the cam 24 is in this position the contact members 22, 23 are still in contact as shown in Fig. 10. Movement of the cam 24 from the position shown in Fig. 9 to that shown in Fig. 10 occurs with such speed that a plainly audible click is heard when the cam 24 is stopped by the flattened portion 16c, thus indicating that the operation of opening the switch 2 has been started. In addition to this audible signal, a tactile signal is given by the sudden jerk imparted to the shaft 16 by the movement of the cam 24. Movement of the cam 24 and selector spring 23 from the position shown in Fig. 10 to that shown in Fig. 11 is controlled by the shaft 16 so that the contact members 22, 23 are separated at a relatively low speed, as is desirable for switching an alternating current circuit, and come to rest with the offset portion 23e of the selector spring seated in the notch 24a in the cam 24. When this point in the movement of the switch members is reached, the rotational force exerted on the cam 24 by the contact members 22, 23 will cease, thus giving a tactile indication that the switch 2 has been opened.

Since the selector spring 23 exerts a rotational force on the cam 24 during the time the inclined surface of the projection 23e bears upon the edge of the notch 24a in the cam 24, the cam 24, unless restrained by the shaft 16, will not remain in any position wherein its edge engages the inclined surface of the projection 23e, but will be rotated by the selector spring 23 to permit the projection 23e to seat itself in the notch 24a in the cam 24, thus permitting separation of the contact members. Thus, if the shaft 16 is normally rotated to a position wherein the inclined surface of the projection 23e engages the edge of the cam 24, and the shaft is then released, the cam 24 will be rotated to the "open" position and will carry the shaft 16 with it.

This action is employed to prevent the shaft 16 from being left in a position such that the contact member 22 and the selector spring 23 are close enough together to permit intermittent arcing or "sputtering" which, of course, is highly destructive to the contact member 22 and selector spring 23. The contact member 22 and the selector spring 23 are so formed and arranged that they are separated sufficiently when in the full "open" position to prevent an arc being maintained or reestablished. If the shaft 16 is left in a position wherein the contact member 22 and the selector spring 23 are intermediate the full "open" and full "closed" position, the selector spring 23 will bear upon the edge of the notch 24a to rotate the cam 24 to full "open" position in the manner above described.

The contact members 22, 23 are so shaped and arranged that the tip 23f of the selector spring 23 breaks contact with the other contact member 22 at a point which lies intermediate the movable end 22d of the contact member 22 and the point at which this member is engaged by the tip 23f when the members 22, 23 are in fully closed position. Thus, burning of the contact member 22 will take place at this intermediate point and hence even if the contact member 22 is weakened due to the burning, there will be no diminution in the pressure which it will exert against the selector spring 23 when the members are in closed position.

With the switch 2 in the open circuit position as shown in Fig. 11 the selector spring 23 has its offset portion 23e nested in the notch 24a in the cam 24 so that the tip 23f is at its greatest distance from the other contact member 22. The switch 2 is thrown to its closed circuit position by turning the shaft 16 of the variable resistance device 1 which effects rotation of the cam 24. As the cam 24 rotates oppositely to the arrow, the offset portion 23e of the selector spring will be lifted out of the notch 24a in the cam 24 and the tip 23f will engage the contact member 22 near the end of the movable portion 22d to close the circuit and, as the selector spring 23 is moved further by rotation of the cam 24, the tip 23f will wipe along the portion 22d and reach its final position simultaneously with movement of the offset portion 23e of the selector spring 23 onto the circular peripheral portion of the cam 24.

The sudden reduction in the rotational force necessary to rotate the shaft 16 that occurs as the offset portion 23e of contact member 23 moves onto the circular portion of the cam 24 gives a positive tactile indication that the switch 2 has been closed. Further rotation of the cam 24, which will occur as the variable resistance device 1 is operated will not change the relative position of the contact members 22, 23.

When it is desired to use the switch in a direct current circuit the angular lost motion between the shaft and the cam is increased sufficiently to permit the contact members to separate in the normal cycle of switch operation without being under control of the shaft. The switch modified for this use is shown diagrammatically in different positions, in Figs. 12 to 14. This form of switch is identical with the previously described form except as to the design of the cam. In the switch shown in Figs. 12 to 14, the cam 124 has a perforation 124b formed with wider end portions than those of the perforation 24b of the cam 24, thus permitting an angular displacement of the cam 124 on the shaft 116, greater than the angular displacement of the cam 24 on the shaft 16. The switch is thrown from the closed circuit position in Fig. 12 to the open circuit position by rotating the shaft 116 in the direction of the arrow until the offset portion 123e of the contact member 123 starts to ride down into the notch 124a of the cam 124 and rotate the cam 124 faster than it is moved by the shaft 116. When the cam 124 passes through the position shown in Fig. 13 the contact members 122, 123 have just started to separate and the cam 124 is moving rapidly, having taken up most of the angular lost motion with the shaft 116 under the rotative influence of the selector spring 123. The cam 124 and selector spring 123 continue to travel unrestrained by the shaft 116 until they reach a position intermediate that shown in Fig. 13 and the final open circuit position shown in Fig. 14. The cam 124 strikes against the flattened portion of the shaft 116 just prior to the time the switch members attain the position shown in Fig. 14 to thus produce a click indicating that the operation has been completed. The circuit is closed in exactly the same manner as described above with the contact members 122, 123 brought into engagement with each other at a speed determined by the rate of rotation of the shaft 116.

It is, of course, obvious that the switch can be thrown into the closed circuit position and then into the open circuit position by rotating the cam in one direction for 360° or more and that either operation can be performed by rotating the cam in either direction, providing, of course, that the location of the rotational stop means of the variable resistance device will permit such rotation.

Chattering or jumpy operation is prevented when the cam 24 is rotated in a counter-clockwise direction (as seen in Fig. 5), from the "on" to the "off" position, by the portion 23b bearing against the bend 23d with sufficient pressure to prevent the bend 23d moving away from the boss 21h under the forces encountered in use. Without this reinforcing pressure the frictional component between the selector spring 23 and the cam 24 tends to move the bend 23d away from the boss 21h until sufficient pressure is built up to overcome the frictional force at which instant the selector spring 23 will jump back to its original position with the bend 23d against the boss 21h. This bracing arrangement also prevents damage to the selector spring 23 when the switch 2 is closed by rotating the cam 24, from the "off" position to the "on" position in a counter-clockwise direction, that is, by an operation reverse to the normal mode of operation, which reverse operation tends to push the bend 23d away from the supporting boss 21h.

It is often desirable to provide for switching several separate circuits simultaneously. This is readily accomplished by the present invention by mounting the required number of switch units in tandem as shown in Fig. 15. Each switch unit 202 is separated from the adjacent switch unit 202 by a plate of insulation 226 that extends beyond the terminals 222 and prevents accidental short circuiting in connecting external circuits, and the switch 202 nearest the variable resistance device is insulated from the cover 207 by an interposed insulating plate 220. Each switch 202 is maintained in angular alinement with the adjacent switch 202 by projections or lugs 221k extending from the open face of the housings 221 and engaging recesses 221m in the end walls of the adjacent housings 221 and notches 220m and 220m in the plates 226 and 220. Rivets 225 that extend through perforations 221L in all of the housings and corresponding perforations 226L, 220L in the insulating plates 226, 220 and perforations in the cover 207 of the associated variable resistance device, serve to secure the switch housings 221 and variable resistance device 201 all together and assist the lugs 221k and recesses 221m in preventing angular displacement of the switch housings 221. The operating shaft 216 is flattened and extends through all switch housings 221 except the one most remote from the variable resistance device 201 and engages all of the switch cams 224. The cams 224 are held in axial position by annular collars molded in the housings 221 similar to the collar 21j in the housing 21 and by spacing washers 227 of insulating material disposed on the shaft 216 between the insulating plates 226, 220 and the cam 224 to serve the purpose of the shoulder on the shaft 16 in the single switch arrangement. Each switch unit 202 operates in this multiple structure in the same manner as described for the single switch 2.

If a special switch sequence is desired the relationship of the notches in the cams to the flat on the shaft can be different in some of the switches so that they will operate in the desired sequence. In such cases it may be desirable to widen the notches in some of the cams so that some of the switches will remain in the open circuit position through a greater arc of shaft movement than in the other switches.

I claim:

1. An electric switch comprising a base having a recess therein, a contact member disposed on said base, a second and resilient contact member having a portion formed with a return bend, said portion being held between the side walls of said recess by the inherent expansive force of the contact member, said resilient contact member having also a free end portion, and a second bend provided between said return bend and said free end portion and bearing against the portion of the contact member on the other side of the return bend to prevent translatory movement of said free end portion in one direction, a side wall of said recess engaging said second bend to prevent translatory movement of said free end portion in another direction, and means for bending the free end portion of said second contact member into engagement with said first contact member.

2. An electric switch comprising a plurality of contact elements, at least one of said contact elements being resilient, means slidably engageable with a resilient contact element for controlling the movement thereof into and out of engagement with its cooperating contact element, said means including two axially adjacent cam members peripherally engaging said resilient contact element, a shaft mounting said cam members and means disposed between said cam members for lubricating the engageable surfaces of said cam and said resilient contact element.

3. A switch comprising a plurality of contact elements at least one of which is movable into engagement with another of said contact elements, means mounting said contact elements in cooperative relation, means for controlling the engagement and disengagement of said contact elements including a cam element formed of a plurality of fibrous insulating discs engageable with said movable contact element, removable and insertable means for rotating said cam element in engagement with said movable contact element, and a suitable lubricant between said discs.

4. An electric switch comprising a plurality of contact elements, at least one of which is resilient and movable into and out of engagement with another of said contact elements, means for controlling the engagement and disengagement of said contact elements including a cam engaging and operating said resilient element, and a shaft for actuating the cam, said cam consisting of a plurality of superposed cam layers engaging said movable contact element with their edge portions, there being lubricant disposed between the adjoining faces of said layers, whereby to lubricate the engageable surfaces of the cam and movable contact element.

NEWTON C. SCHELLENGER.